United States Patent [19]

Tanaka et al.

[11] 4,166,943
[45] Sep. 4, 1979

[54] APPARATUS FOR WELDING LEAD WIRES TOGETHER

[75] Inventors: Masaru Tanaka, Toyonaka; Yoshimitsu Matsumoto, Hyogo, both of Japan

[73] Assignee: Matsushita Electric Industrial Co., Ltd., Osaka, Japan

[21] Appl. No.: 803,434

[22] Filed: Jun. 6, 1977

Related U.S. Application Data

[62] Division of Ser. No. 693,846, Jun. 8, 1976, Pat. No. 4,091,259.

[51] Int. Cl.² ............................................. B23K 9/32
[52] U.S. Cl. ............................... 219/159; 219/56.1; 219/153
[58] Field of Search ............... 219/159, 153, 75, 125.1, 219/56.1; 228/904

[56] References Cited

U.S. PATENT DOCUMENTS

| 471,242 | 3/1892 | De Meritens | 219/138 X |
| 1,937,717 | 12/1933 | Rosner | 219/153 |
| 2,279,044 | 4/1942 | Heist | 219/137 R X |
| 2,708,702 | 5/1955 | Albrecht | 219/137 R |
| 4,038,743 | 8/1977 | Du Rocher | 228/904 X |

*Primary Examiner*—E. A. Goldberg
*Attorney, Agent, or Firm*—Burgess, Ryan and Wayne

[57] ABSTRACT

A method for welding lead wires together by twisting into a strand a plurality of lead wires of electrical parts or the like, producing an arc between the strand and a carbon electrode, thereby melting and welding the strand by the heat from the arc to obtain a weld of high quality.

8 Claims, 6 Drawing Figures

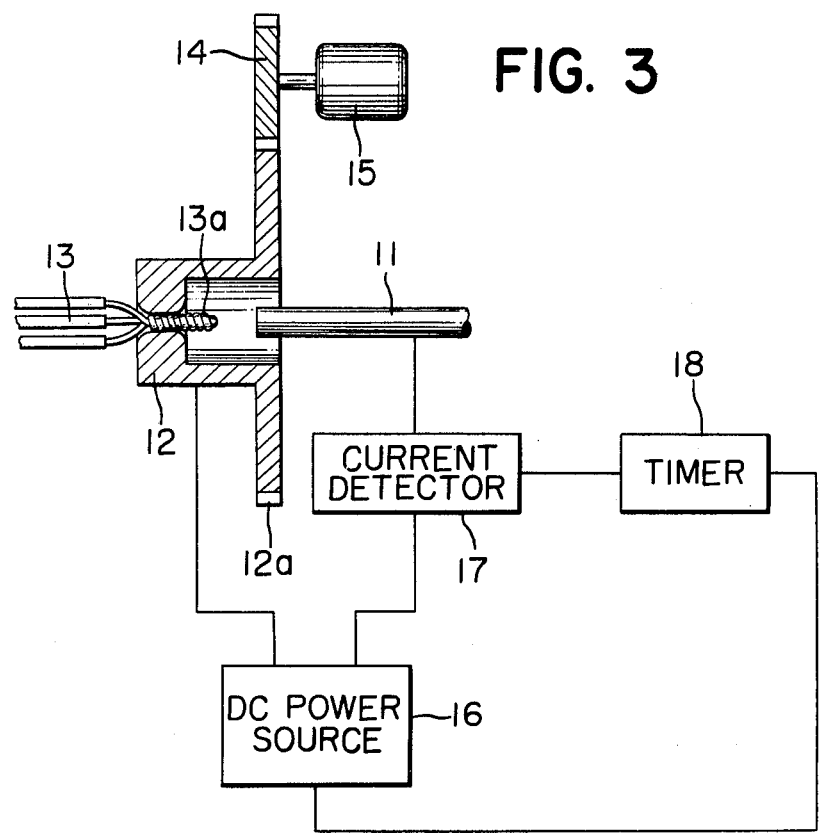
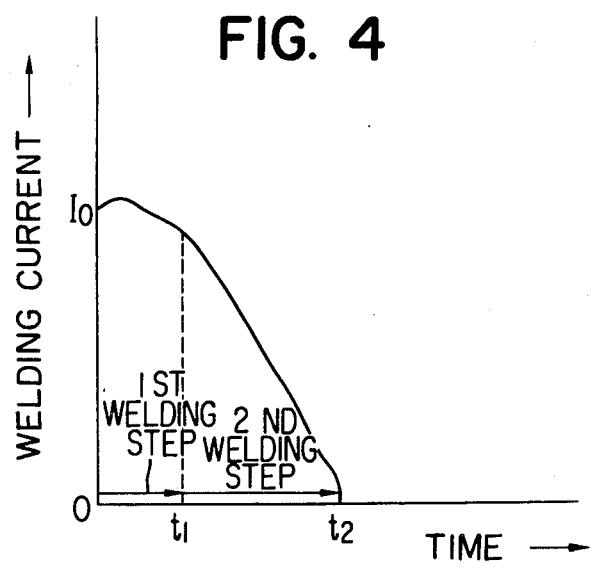

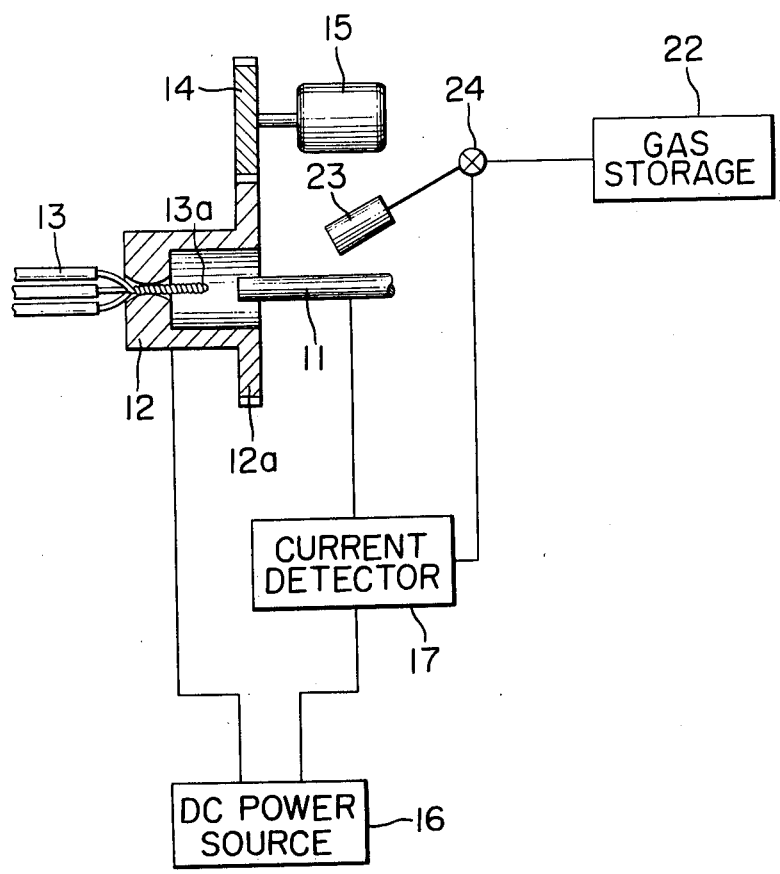

4,166,943

APPARATUS FOR WELDING LEAD WIRES TOGETHER

This is a division of U.S. patent application Ser. No. 693,846, filed June 8, 1976, now issued as U.S. Pat. No. 4,091,259 issued May 23, 1978.

BACKGROUND OF THE INVENTION

The present invention relates to a method and apparatus for producing an arc between a carbon electrode and the tip of a strand consisting of a plurality of lead wires of electrical parts or the like, thereby heating and melting the strand by the heat energy from the arc.

In general, the assembly of electrical parts includes a step for interconnecting lead wires of various parts. According to one of the prior art methods for connecting lead wires, a torch of a tungsten inert-gas welding equipment is placed in such a way that its tungsten electrode is in opposed relation with the tip of lead wires to be welded together, a high-frequency generator is actuated to break the electrical insulation between the tips of the lead wires and the tungsten electrode so that an arc may be formed between them and the lead wires may be melted by the heat energy from the arc. After the tips of the lead wires have been suitably melted, the arc is extinguished, whereby the weldment is obtained.

The welding method of the type described above has an advantage in that a weld of high quality can be obtained within a very short time, but also has serious defects in that expensive shielding gas is required, the ultraviolet rays emitted from the arc damage the eyes of the operator, and electrical parts connected to the lead wires are burned out by the high frequency current applied to the lead wires to be joined together.

SUMMARY OF THE INVENTION

In view of the above the primary object of the present invention is to provide a method and apparatus for welding lead wires together in a very simple yet very reliable manner so as to provide welds of high quality.

Another object of the present invention is to provide a method and apparatus for permitting the stranding of lead wires to be welded together and the welding thereof to be accomplished in one step at the same station so that the number of steps required for welding the lead wires together may be minimized.

A further object of the present invention is to provide a method and apparatus for welding lead wires together while preventing damage to the eyes of an operator from the intense rays from the arc.

A further object of the present invention is to provide a method and apparatus for welding lead wires together with the use of a carbon electrode so that an arc may be readily produced and stabilized, whereby the welding operation may be facilitated and welds with higher quality may be obtained.

To the above and other ends, the present invention provides a method for welding lead wires together by the steps of twisting into a strand the tip portions of a plurality of lead wires to be welded together, restraining the lead-wire strand in a block, through which is supplied welding current to the lead-wire strand, in alignment with a carbon electrode, and producing an arc between the tip of the lead-wire strand and the carbon electrode, thereby melting and welding the tip of the lead-wire strand.

BRIEF DESCRIPTION OF THE DRAWINGS

FIG. 3 is a diagrammatic view of a second embodiment of the present invention;

FIG. 4 is a graph used for the explanation of the second embodiment; and

FIGS. 5 and 6 are diagrammatic views of a third and a fourth embodiments of the present invention.

Same reference numerals are used to designate similar parts throughout the FIGS. 2-6.

DESCRIPTION OF THE PREFERRED EMBODIMENTS

Figure 1:
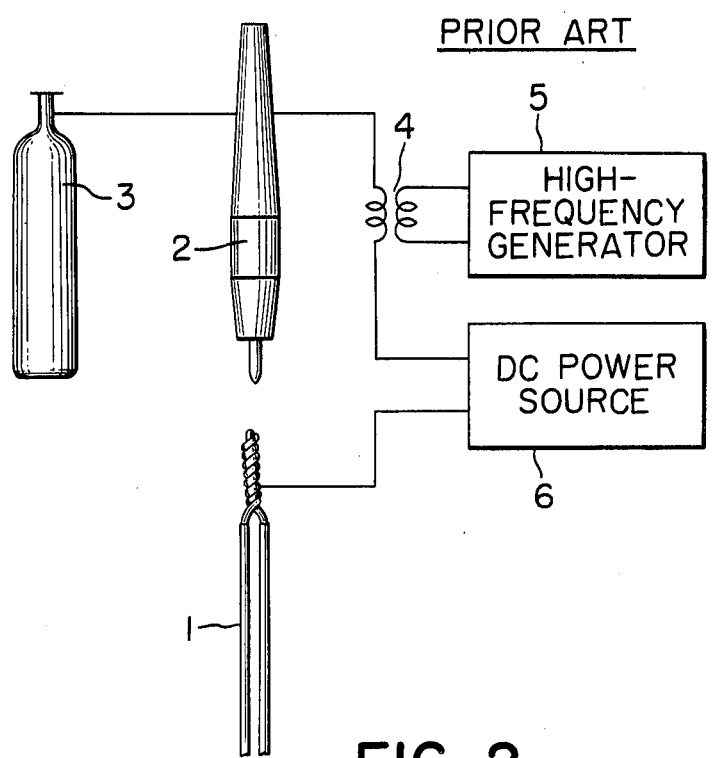
FIG. 1 is an electrical circuit diagram of a prior art welding apparatus and method for welding lead wires together.

Prior Art, FIG. 1

In FIG. 1 there is shown an electrical circuit diagram of one example of the prior art lead wire welding machines. Reference numeral 1 denotes lead wires to be welded; 2, an electrode holder of, for instance, a tungsten inert-gas or TIG welding equipment; 3, a cylinder containing inert gas for protecting a tungsten electrode of holder 2; 4, high-frequency coupling coils for forming an arc; 5, a high-frequency generator; and 6, a direct-current power source.

In operation, the tip of the tungsten electrode is held in opposed relation to the twisted and stranded tip of the lead wires 1 to be welded, and the high-frequency generator 5 is activated. The electrical insulation between the tungsten electrode and the lead-wire strand 1 is broken by the high-frequency current generated by the high-frequency generator 5 so that an arc is formed between the tungsten electrode and the lead-wire strand 1 and consequently the tip of the lead-wire strand 1 is melted. After the lead wires 1 have been suitably melted, the DC power supply 6 is cut off so that the arc is extinguished and the welding step is completed.

With the prior art welding equipment of the type described above, high quality welds can be obtained within a very short time. However, the process still has some defects in that the eyes of the operator are damaged by the large amounts of ultraviolet rays emitted from the arc and very expensive inert gas is required for the protection of the tungsten electrode. In addition, there is a danger that the electrical components connected to the lead wires 1 may be damaged by the high-frequency current applied between the electrode and the lead wires 1 in order to establish an arc therebetween.

Figure 2:
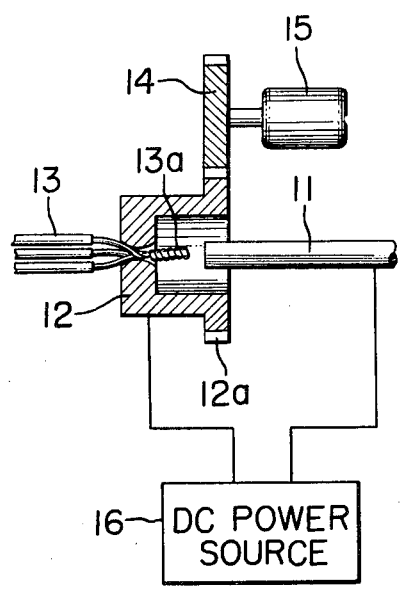
FIG. 2 is a diagrammatic view of a first embodiment of a welding apparatus adapted to carry out a welding method in accordance with the present invention.

First Embodiment, FIG. 2

In FIG. 2, there is shown an electrical circuit diagram of a first embodiment of the present invention. Reference numeral 11 denotes a carbon electrode in the form of a rod; 12, a rotary twisting block for twisting into a strand lead wires 13 to be welded together, the block 12 being in coaxial relation with the carbon electrode 11 and being U-shaped in cross section so that the tip 13a of the lead-wire strand and the tip of the carbon electrode 11 may be located within a welding chamber or cylindrical opening of the twisting block 12; 14, a driving gear in mesh with a driven gear 12a formed integrally with the twisting block 12 and carried by the drive shaft of a motor 15 so that the rotation thereof may be transmitted to the twisting block 12; and 16, a DC power source with one terminal going to the carbon electrode 11 and the other terminal, to the twisting block 12.

Next, the mode of operation will be described. The lead wires 13 to be welded together are uniformly arrayed, and inserted into the opening of the twisting block 12 so that the lead-wire strand is extended into the cylindrical opening and bought into contact with the tip of the carbon electrode 11. Since the lead-wire strand is electrically connected to one terminal of the DC power source 16 while the carbon electrode 11 is connected to one terminal thereof, an arc is established between the tips of the lead-wire strand 13a and the carbon electrode 11 so that the tip of the lead-wire strand is melted. The length of the arc is gradually increased as the tip of the lead-wire strand is melted, and finally exceeds the critical length of the arc which the DC power source 16 can maintain. Then the arc is extinguished and the welding of the tips of the lead wires is accomplished. Thereafter the welded lead-wire strand is pulled out of the twisting block 12.

In order to extinguish the arc, the motor 15 may be stopped at a suitable time to stop the feed of the lead-wire strand toward the tip of the carbon electrode 11 so that the arc may be positively extinguished instead of being naturally extinguished. Alternatively, when the length of the arc is increased faster than the feed speed of the lead-wire strand, the arc may be naturally extinguished even when the feed is continued toward the carbon electrode. A further alternative method is cut off the DC power supply a predetermined time after the arc has been established.

The use of the carbon electrode 11 is very important because a metal deposit between the lead-wire strand and the carbon electrode rarely occurs when the arc is formed therebetween and the arc may be easily established. When the carbon electrode is made the negative terminal, the arc is stabilized by the flow of thermions emitted from the carbon electrode so that welds with high quality can be obtained.

According to the first embodiment, the step for twisting and stranding the lead wires and the step for welding the lead wires together can be simultaneously carried out at the same station so that considerable economical advantages can be obtained. Since the arc is formed within the twisting block, the eyes of the operator may be prevented from being damaged. Since the carbon electrode is used, the arc can be readily established in a simple manner and well stabilized so that the welding operation may be readily performed and the welds of high quality can be obtained.

The critical length of the arc at which the arc is extinguished is mainly dependent upon the voltage of the DC power supply but almost independent of the number of lead wires to be twisted and welded together. Therefore the arc time or welding time may be automatically adjusted. That is, it is not necessary to change the welding conditions depending upon the number of lead wires.

Second Embodiment, FIGS. 3 and 4

The second embodiment shown in FIG. 3 is substantially similar in construction to the first embodiment described above except that one terminal of the DC power source 16 is connected through a current detector 17 to the carbon electrode 11 and a timer 18 is connected for changing the welding conditions as will be described in detail hereinafter.

Next the mode of operation will be described. As with the first embodiment, the lead wires to be twisted and welded together are inserted into the opening of the twisting block 12 so that the lead-wire strand is extended into the cylindrical opening and brought into contact with the tip of the carbon electrode. An arc is formed between them and the tip of the lead-wire strand is gradually melted.

According to the second embodiment, during a step before and immediately after the arc is formed, a high welding voltage and a high current are used. This step is referred to as "a first welding step" in this specification. The timer 18 so operates $t_1$ after the arc is formed that the first welding step is switched to a second welding step in which the welding proceeds at a low voltage and a low current as shown in FIG. 4. In the first welding step the welding current and voltage are both high so that the arc may be formed in a positive manner, and after the arc has been established, the first step is switched to the second welding step so that the melting of the tip of the lead-wire strand proceeds until the length of the arc exceeds the critical length which is dependent upon the lower welding voltage and current used in the second step. When the arc exceeds the critical length, it is naturally extinguished and a weld of high quality is obtained.

FIG. 4 shows the relationship between the welding current and time when the initial welding current $I_0$ at $t=0$ is 120 A, $t_1$ is 0.1 sec. and $t_2$, 0.3 sec. If the first welding step is not switched to the second welding step after the arc has been established, the tip of the lead-wire strand would be melted too much and the welds would be considerably varied in size, quality, etc.

In addition to the advantages of the first embodiment, the second embodiment provides the following advantages:

(1) The welding process may be more readily controlled because in the first welding step the high welding voltage and current are supplied to facilitate the formation of the arc and in the second welding step the critical or ultimate arc length at which the arc is extinguished naturally can be precisely controlled; and (2) Since the critical or ultimate arc length can be precisely controlled, welds of high and uniform quality can be obtained.

Figure 5:
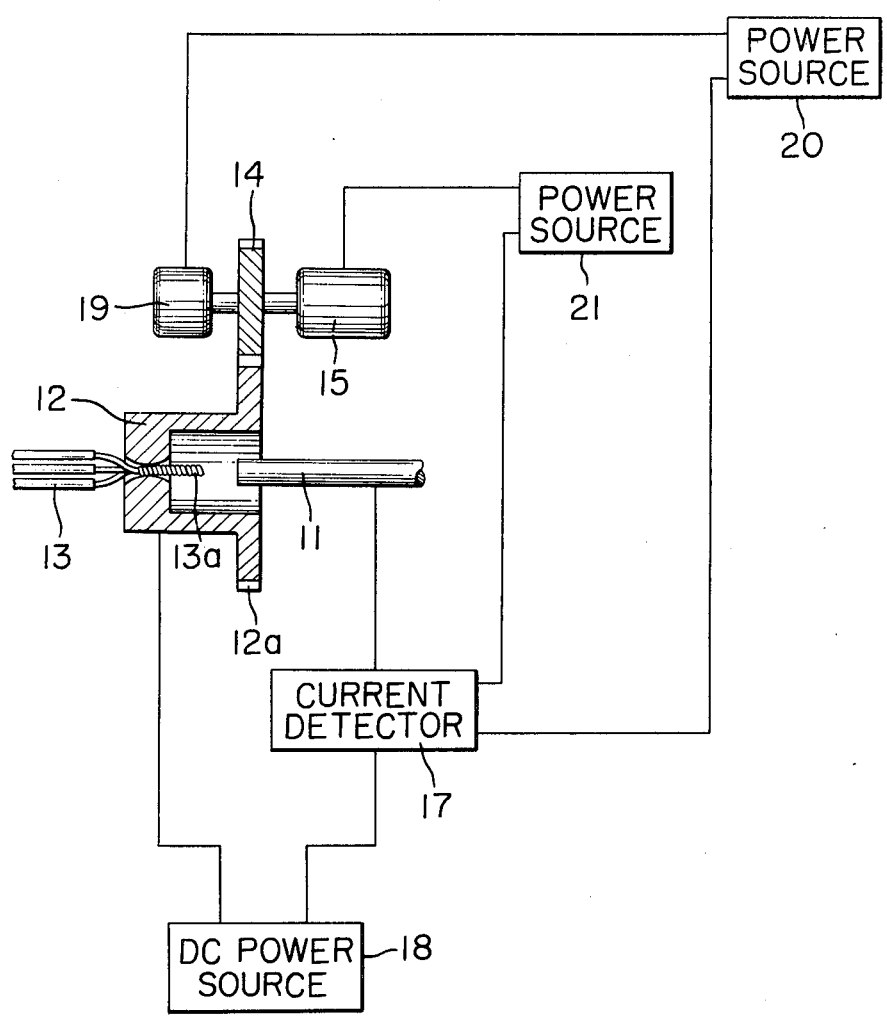

Third Embodiment, FIG. 5

In FIG. 5 there is shown an electrical circuit diagram of the third embodiment of the present invention which was made not only to obtain the weldments with higher quality but also to facilitate the maintenance of the welding equipment by minimizing the consumption of the electrode as practically as possible. The third embodiment is substantially similar in construction to the second embodiment shown in FIG. 3 except that it further includes an electromagnetic brake 19 attached to the shaft of the driving gear 14 and electrically connected to a power source 20 and a power source 21 for the motor 15. The current detector or current actuating means 17 is interconnected between the carbon electrode 11 and one terminal of the DC power source 16 in such a way that when the power supply from the DC power source 16 is started, the current detector or current-actuated means 17 is actuated to interrupt the supply of the power from the power source 21 to the motor 15 while causing the power source 20 to supply the power to the electromagnetic brake 19.

Next the mode of operation will be described. The lead wires 13 to be twisted and welded together are inserted into the opening of the twisting block 12 so that the leadwire strand emerges out of the opening and is brought into contact with the tip of the carbon electrode 11 as with the case of the first or second embodiments described above. Then an arc is formed between the tip 13a of the lead-wire strand and the tip of the carbon electrode 11 so that the tip 13a of the strand is melted. According to the third embodiment the current detector or current-actuated means 17 is actuated immediately after the tips of the strand and carbon electrode 11 have been brought into contact with each other or the arc has been established therebetween so that the electromagnetic brake 19 is actuated to stop the rotation of the drive gear 14 and hence the twisting block 12 while stopping the motor 15. As a result the feed of the lead-wire strand is stopped, but the melting of the tip of the lead-wire strand proceeds and consequently the arc length exceeds the critical arc length. Then the arc is naturally extinguished and the tips of the lead wires 13 are welded together.

As the result of the extensive experiments conducted by the inventor it was found out that the following two problems arise unless the rotation of the twisting block 12 is stopped immediately after the contact between the lead-wire strand and the carbon electrode 11 or the establishment of the arc between them. That is, (1) when the rotational speed of the twisting block 12 is too fast, there occurs a short-circuit between the lead-wire strand and the carbon electrode 11 so that the arc wanders and becomes unstable, resulting in the unsatisfactory weld, and (2) when the feed speed of the lead-wire strand is such that the critical arc length is barely maintained even when the twisting block 12 is rotating at a predetermined speed, the arc is unstable, resulting in the production of a large amount of sputter. Therefore the abnormal temperature rise results with the resultant abnormal consumption of the carbon electrode 11.

After welding, the motor 15 is rotated in response to the control signal from the current detector or current-actuated means 17 so that the welded lead-wire strand may be easily pulled out of the twisting block 12.

In the third embodiment, the current detector or current-actuated means 17 is used to control the feed of the lead-wire strand, but it is to be understood that any suitable voltage-activated means may be employed instead of the current-actuated means 17. Instead of stopping the motor 15 by interrupting the power supply thereto, a suitable electromagnetic clutch or the like may be interconnected between the motor 15 and the driving gear 14. Instead of the electromagnetic brake 19, any other suitable means capable of accomplishing the same function with that of the brake 19 may be employed.

As described above, according to the third embodiment in accordance with the present invention, the feed of the lead-wire strand is stopped immediately after it has been brought into contact with the carbon electrode. Therefore an arc can be produced immediately in a stable manner and because the arc is naturally extinguished when the arc length exceeds the critical length, the length of the tip melted of the lead-wire strand becomes uniform so that a weld of high quality can be obtained and the consumption of the carbon electrode can be minimized. In addition, the supply of the power to the lead-wire strand through the twisting block 12 is made during the time when the latter is at rest so that the consumption of the block 12 can be also minimized. Thus the third embodiment of the present invention can considerably facilitate the maintenance of the welding equipment.

Fourth Embodiment, FIG. 6

The fourth embodiment shown in FIG. 6 was made to reduce the welding time and to obtain welds of improved quality. The fourth embodiment is substantially similar in construction to the second embodiment shown in FIG. 3 except that it further includes a storage unit or element 22 storing therein gas such as air, nitrogen, argon or the like and connected to a gas injection nozzle 23 through a solenoid-controlled valve 24 which is controlled in response to the control signal from the current detector or current-activated means 17. The gas is injected through the injector 23 into the cylindrical opening of the twisting block 12 in order to cool the tips of the lead-wire strand and carbon electrode 11. The current-actuated means 17 is actuated only when the power is supplied from the DC power source 16, generating the control signal in response to which the solenoid-controlled valve 24 is closed.

Next the mode of operation of the fourth embodiment will be described. Then the tip of the lead-wire strand is brought into contact with the tip of the carbon electrode 11, an arc is produced between them so that the tip 13a of the strand is melted. The current-activated means 17 will not generate the control signal to be applied to the solenoid-controlled valve 24 to open it from the time when the tips of the strand and carbon electrode 11 are brought into contact with each other so that the arc is formed between them till the time when the arc is naturally extinguished as the arc length exceeds the critical length. Therefore no gas is injected through the nozzle 23 into the hollow cylindrical opening of the twisting block 12. Once the arc length exceeds the critical length so that the arc is extinguished, the current-activated means 17 generates the control signal which is transmitted to the solenoid-controlled valve 24 to open it so that the gas is injected into the cylindrical opening of the twisting block 12 to cool the molten metal in the form of a sphere at the tip of the lead-wire strand, the carbon electrode and the twisting block 12.

As in the case of the third embodiment, instead of the current-actuated means 17, any suitable voltage-activated means may be employed. The positive extinction of the arc can be accomplished by stopping the motor 15 immediately after the contact between the lead-wire strand and the carbon electrode 11, thereby interrupting the feed of the strand. However when the feed speed of the strand is such that the arc length is gradually increased, the arc is naturally extinguished when the arc length increases and exceeds the critical arc length as described elsewhere. Alternative method is to interrupt the power supply from the DC power source 16 a predetermined time after the arc has been produced, which has been also described elsewhere.

According to the fourth embodiment, as with the case of the first, second or third embodiments, the step for stranding the lead wires and the step for welding their tips together can be simultaneously made at the same station so that many economical advantages can be achieved. In addition, the molten metal is cooled by the gas immediately after the arc has been extinguished so that the molten metal may be rapidly cooled and consequently the welded lead-wire strand can be withdrawn out of the twisting block 12 faster as compared with the welding equipment not provided with such a cooling system. As a result, the overall welding time can be considerably reduced. When the arc is not produced, the carbon electrode and the twisting block are cooled by the gas so that their temperature rise may be minimized, the consumption of the carbon electrode may be also minimized, the adhesion of sputter to the carbon electrode may be eliminated and the melting of and damages to the vinyl insulation of the lead wires may be prevented. Therefore, welds of high quality can be obtained, the welding operations can be much facilitated and considerable economical advantages can be attained.

In the first through fourth embodiments, the lead wires have been described as being twisted into a strand by the twisting block 12 which is driven by the motor 15 before they are welded together, but it is to be understood that the lead wires which have been already twisted into a strand may be inserted into a block similar in shape to the twisting block 12.

What is claimed is:

1. Apparatus for welding electrical lead wires together comprising:

a rotatable U-shaped block of electrically conductive material having a welding chamber therein, a wall of said block having an aperture for receiving said wires so that ends of said wires are disposed adjacent the open portion of said chamber and said wires are in electrical contact with said block;

a carbon electrode having an end thereof extending into the open portion of said chamber in alignment with said aperture;

means for applying a DC voltage between said electrode and said block to provide a predetermined arc-producing potential difference between the ends of said wires and said electrode when said wires are disposed as aforesaid, so that when said wires are so disposed and the ends thereof are brought into contact with the end of said electrode, an electric arc is established therebetween within said welding chamber to weld said lead wires together; and means for rotating said block to twist said wires together and to feed said wires toward said electrode.

2. Apparatus according to claim 1, further comprising means for stopping the rotation of said block when said arc is established.

3. Apparatus according to claim 1, further comprising means for extinguishing said arc a predetermined time after said arc is established.

4. Apparatus according to claim 1, further comprising means for extinguishing said arc by stopping the rotation of said block a predetermined time after said arc is established.

5. Apparatus according to claim 1, further comprising means for applying a first relatively high voltage between said wires and said electrode before said arc is established, and for applying a second relatively low voltage therebetween after said arc is established.

6. Apparatus according to claim 1, wherein the polarity of said voltage is negative at said electrode and positive at said block.

7. Apparatus according to claim 1, further comprising means for directing a cooling fluid onto said wires after said wires have been welded together.

8. Apparatus according to claim 7, wherein said cooling fluid is directed onto said wires only at a time when current is not flowing between said wires and said electrode.

* * * * *